United States Patent
Rhee

(10) Patent No.: US 6,957,446 B2
(45) Date of Patent: Oct. 18, 2005

(54) MULTI-FUNCTION TELEVISION

(75) Inventor: Young-Kook Rhee, Anyang (KR)

(73) Assignee: Global Networks & Systems Co., Ltd., Seoul (KR)

( * ) Notice: Subject to any disclaimer, the term of this patent is extended or adjusted under 35 U.S.C. 154(b) by 706 days.

(21) Appl. No.: 10/114,440

(22) Filed: Apr. 3, 2002

(65) Prior Publication Data

US 2003/0023985 A1 Jan. 30, 2003

(30) Foreign Application Priority Data

Jul. 26, 2001 (KR) .......................... 2001-45107

(51) Int. Cl.$^7$ ................................ H04N 7/16

(52) U.S. Cl. ...................... 725/139; 348/731

(58) Field of Search ................ 725/131, 139, 725/151; 348/731, 725

(56) References Cited

U.S. PATENT DOCUMENTS

| | | | | |
|---|---|---|---|---|
| 5,400,401 A | * | 3/1995 | Wasilewski et al. | 380/212 |
| 5,740,460 A | * | 4/1998 | Wise et al. | 348/473 |
| 5,883,670 A | * | 3/1999 | Sporer et al. | 375/240.25 |
| 6,305,021 B1 | * | 10/2001 | Kim | 725/131 |

* cited by examiner

*Primary Examiner*—Vivek Srivastava
(74) *Attorney, Agent, or Firm*—Antonelli, Terry, Stout and Kraus, LLP.

(57) ABSTRACT

The present invention discloses a multi-function television. In accordance with the present invention, the cable/radio broadcasting signal and the auxiliary image and audio signals inputted to the television are converted into the digital image data and audio data, encoded and stored according to the user's selection. The stored digital image data and audio data are outputted in form of the analog still image and audio. Accordingly, the television can convert the displayed and outputted image and audio into the digital data, store and reproduce the digital data without requiring an additional apparatus.

10 Claims, 2 Drawing Sheets

MULTI-FUNCTION TELEVISION

BACKGROUND OF THE INVENTION

1. Field of the Invention

The present invention relates to a television, and in particular to a multi-function television which can easily capture, store and reproduce image and audio according to the user's selection.

2. Description of the Background Art

In general, a television is an apparatus for transmitting an instantaneous image of a moving or motionless object to another place without a time delay by using an electric wave or electric signal.

In the near past, the television was recognized as an image apparatus for outputting an image and audio transmitted from a broadcasting station through an electric wave or cable communication. According to recent development of information communication technologies and fusion tendencies of information communication apparatuses, a variety of information processing technologies have been introduced to the television.

An internet television accessing the internet and providing web surfing, and a game-incorporated television having a built-in game unit are known as the television using the information processing technology.

Recently, people are more interested in multimedia contents due to technical development and distribution of personal information communication apparatuses such as a personal computer terminal and an encoding format portable digital audio apparatus (for example, MP3 player etc.). There are thus increasing demands of the users to store analog image and audio outputted from the television in form of digital data, and reproduce the stored image and audio in a wanted time.

In order to capture the image and audio outputted from the television, convert the captured image and audio into digital data, and store and reproduce the digital data, there are required a television tuner for receiving a broadcasting wave or a signal input unit for receiving image and audio signals from the television, a high-priced multimedia board for processing the image and audio signals from the television tuner or the signal input unit, and a computer terminal for storing and displaying the image and audio signals processed by the multimedia board.

There are several problems in the conventional art that the high-priced information communication apparatuses such as the computer terminal and the multimedia board are required to capture, store and reproduce the image and audio outputted from the television. In addition, technical knowledge is necessary to handle such apparatuses. Accordingly, ordinary people are not able to easily use the apparatuses due to the high price and difficult usage.

Moreover, considering that the computer terminal and the multimedia board are similar in technical constitution to the television, it is economically disadvantageous to use all of the television, the computer terminal and the multimedia board.

SUMMARY OF THE INVENTION

Accordingly, it is an object of the present invention to provide a multi-function television which can directly convert image and audio into digital data, and store and reproduce the digital data.

In order to achieve the above-described object of the invention, there is provided a multi-function television comprising: a television tuner for receiving a broadcasting signal as a cable/radio signal type, tuning the received signals in a frequency band selected by the user, transmitting the tuned analog type composite image signal and an audio signal; an image decoding unit for separating horizontal/vertical synchronous signals and a digital image signal from the analog composite image signal from the TV tuner and converting the signals, and transmitting the signals; a user's interface means for receiving the operation commands from the user; a multimedia processing unit for digitizing a digital image signal inputted from the image decoding unit and an analog audio signal inputted from the television tuner, capturing, encoding and storing the digitized data, and decoding the encoded data, outputting the image and audio signals for reproduction; a memory means for storing digital image and audio data, an internal function command code for encoding/decoding the image and audio data and temporary data for the processing of image and audio data; an image display means for receiving the image signal outputted from the multimedia media processing unit and displaying the image; an audio output means for receiving the audio signal outputted from the television tuner and outputting the audio; and a control unit for controlling the television tuner, the image decoding unit, the multimedia processing unit, the image displaying means and the audio output means according to the operation command inputted from the user's interface means.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A multi-function television in accordance with a preferred embodiment of the present invention will now be described in detail with reference to the accompanying drawings.

Figure 1:
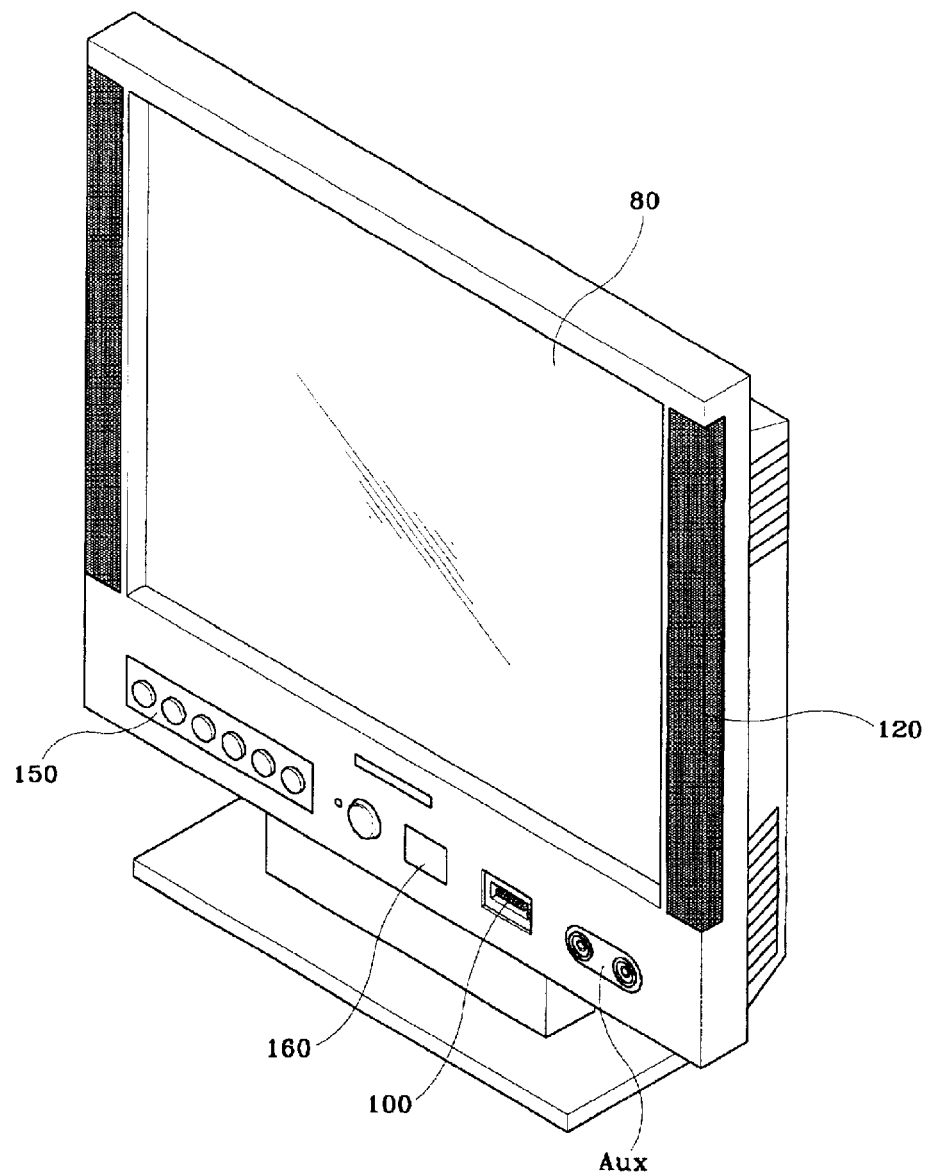
FIG. 1 is a perspective view illustrating an appearance of a multi-function television in accordance with a preferred embodiment of the present invention.
Figure 2:
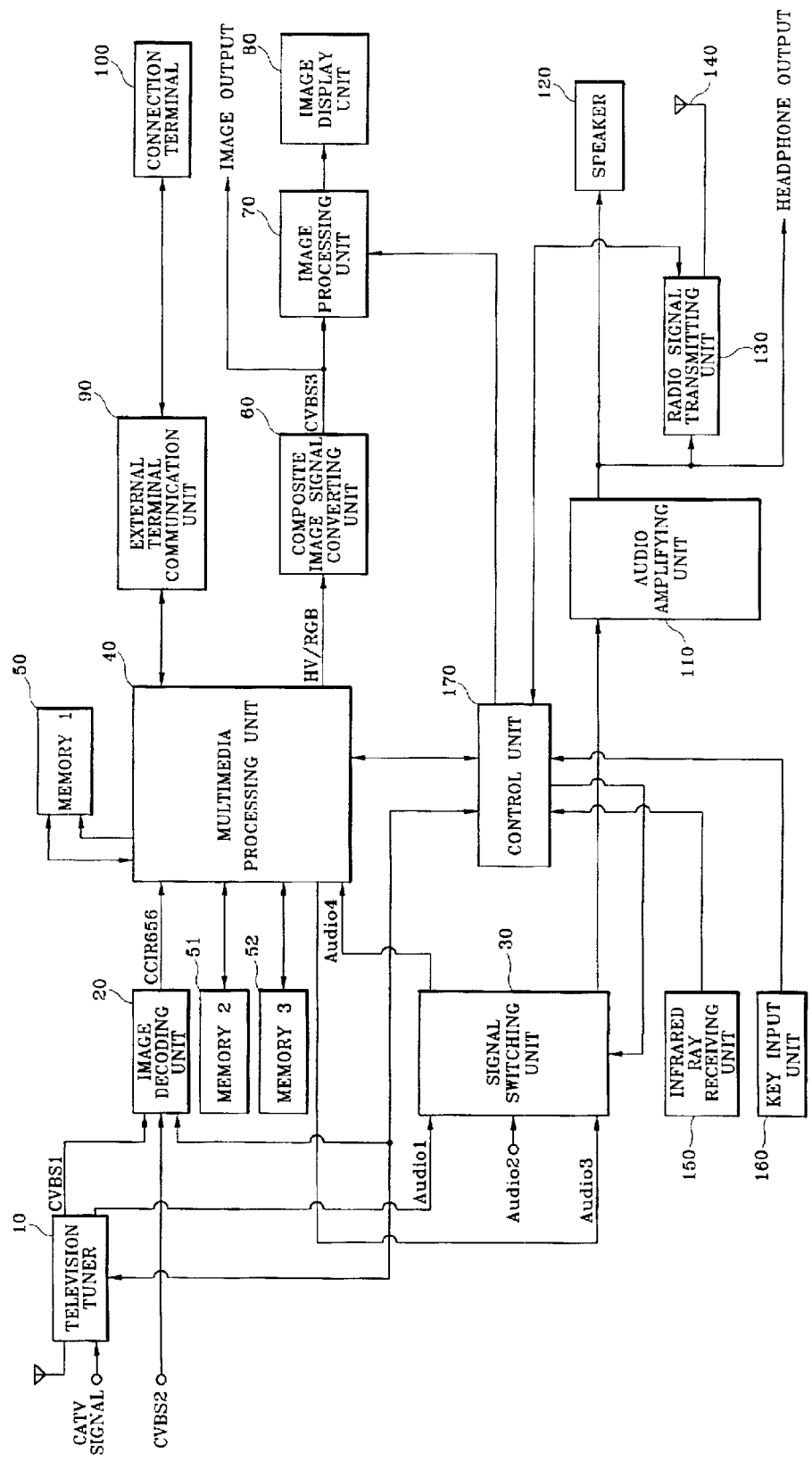
FIG. 2 is a block diagram illustrating the multi-function television of FIG. 1.

FIG. 1 is a perspective view illustrating an appearance of the multi-function television in accordance with the present invention, and FIG. 2 is a block diagram illustrating the multi-function television of FIG. 1. As illustrated in FIGS. 1 and 2, the multi-function television includes a television tuner 10, an image decoding unit 20, a signal switching unit 30, a multimedia processing unit 40, a plurality of memories 50~52, a composite image signal converting unit 60, an image processing unit 70, an image display unit 80, an external terminal communication unit 90, a connection terminal 100, an audio amplifying unit 110, a speaker 120, a radio signal transmitting unit 130, a radio signal transmitting antenna 140, an infrared ray receiving unit 150, a key input unit 160 and a control unit 170.

The television tuner 10 (hereinafter, abbreviated as 'TV tuner') receives a television broadcasting wave signal and a cable broadcasting signal (for example, CATV signal etc.) under the control of the control unit 170, tunes the received signals in a frequency band selected by the user, transmits a tuned analog composite image signal CVBS1 to the image decoding unit 20, and transmits an audio signal Audio1 to the signal switching unit 30.

The image decoding unit 20 separates horizontal/vertical synchronous signals and a digital image signal from the analog composite image signal CVBS1 from the TV tuner 10 and an analog composite image signal CVBS2 inputted through an auxiliary signal input terminal Aux, converts the signals, and transmits the signals to the multimedia processing unit 40.

The signal switching unit 30 selectively transmits the audio signal Audio1 from the TV tuner 10, an audio signal Audio2 inputted through the auxiliary signal input terminal Aux, and an audio signal Audio3 inputted from the multimedia processing unit 40 to the multimedia processing unit 40 and the audio amplifying unit 110 according to the switching operation under the control of the control unit 170.

The multimedia processing unit 40 converts the inputted analog image and audio signals into digital data, captures, encodes and stores the data, outputs the image and audio signals for reproduction, and transmits/receives the image and audio data to/from an external apparatus.

The first memory 50 temporarily stores the image and audio data for the multimedia processing of the multimedia processing unit 40. For example, a SDRAM(synchronous dynamic random access memory) may be used as the first memory.

The second memory 51 stores built-in function command codes for image encoding/decoding and audio encoding/decoding in the multimedia processing of the multimedia processing unit 40. For instance, a flash memory may be used as the second memory.

The third memory 52 stores the image and audio data converted into digital data by the multimedia processing unit 40 or inputted from the external terminal through the medium of the external terminal communication unit 90. For example, the flash memory may be employed as the third memory.

The composite image signal converting unit 60 converts the analog horizontal/vertical synchronous signal H/V and an image chrominance signal RGB from the multimedia processing unit 40 into the composite image signal CVBS3, and transmits the composite image signal CVBS3 to the image processing unit 70.

The image processing unit 70 transmits an image display control signal for displaying the image to the image display unit 80 according to the composite image signal CVBS3 from the composite image signal converting unit 90.

The image display unit 80 displays the image according to the image display control signal from the image processing unit 70. A thin film transistor liquid crystal display device may be employed as the image display unit 80.

The external terminal communication unit 90 relays the image and audio data transmitted or received between the external terminal accessing through the medium of the connection terminal 100 and the multimedia processing unit 40 through a local area communication protocol. Here, a universal serial bus (USB) communication protocol may be used as the local area communication protocol.

The audio amplifying unit 110 amplifies the audio signal from the signal switching unit 30, and transmits the amplified signal to the speaker 120 and the radio signal transmitting unit 130. The speaker 120 converts the audio signal from the audio amplifying unit 110 into an audible audio signal, and outputs the audible audio signal.

The radio signal transmitting unit 130 converts the audio signal from the audio amplifying unit 110 into a radio frequency signal, and transmits the converted signal through the antenna 140.

The infrared ray receiving unit 150 converts an infrared ray signal from a remote controller (not shown) into an electric key signal, and inputs the electric key signal to the control unit 170. The key input unit 160 includes a plurality of operation buttons. When the user operates one of the operation buttons, the key input unit 160 generates a corresponding key signal, and inputs the key signal to the control unit 170.

The control unit 170 controls the TV tuner 10, the image decoding unit 20, the signal switching unit 30, the multimedia processing unit 40, the image processing unit 70 and the radio signal transmitting unit 130 according to the key signal from the infrared ray receiving unit 150 and the key input unit 160, thereby outputting the image and audio according to the user's selection.

The operation of the multi-function television in accordance with the present invention will now be explained with reference to the accompanying drawings.

Firstly, when the user applies main power to the multi-function television by operating a main power switch, the respective units of the multi-function television are initialized.

When the user inputs an operation command through the remote controller, the infrared signal corresponding to the operation command is transmitted from the remote controller to the infrared ray receiving unit 160. The received signal is converted into an electric key signal in the infrared ray receiving unit 160, and the converted signal is inputted to the control unit 170.

In addition, when the user inputs an operation command by operating the operation buttons of the key input unit 150, the key signal corresponding to the operation command is generated in the key input unit 150, and inputted to the control unit 170.

The control unit 170 recognizes the operation command selected by the user on the basis of the key signal inputted from the infrared ray receiving unit 150 and the key input unit 160.

When the user selects a TV watch, the control unit 170 transmits to the TV tuner a control signal for controlling tuning output of a broadcasting signal having a frequency band corresponding to the channel which the user selects through the key input unit 160 or remote controller, and also transmits a control signal for commanding decoding of the image signal from the TV tuner 10 to the image decoding unit 20. In addition, the control unit 170 transmits a control signal for controlling display of the inputted image to the multimedia processing unit 40 and the image processing unit 70, and also transmits a control signal for controlling the inputted audio signal to be transmitted to the audio amplifying unit to the signal switching unit 30.

The TV tuner 10 tunes the signal corresponding to the frequency band of the channel selected by the user among the television broadcasting wave signal and cable broadcasting signal (for example, CATV signal etc.), and generates the analog type composite image signal CVBS1 under the control of the control unit 170.

The composite image signal CVBS1 outputted from the TV tuner 10 is inputted to the image decoding unit 20. The image decoding unit 20 separates the horizontal/vertical synchronous signal H/V and the digital image signal from the analog composite image signal CVBS1 from the TV tuner 10, converts the resulting signals, and transmits the converted signals to the multimedia processing unit 40 under the control of the control unit 170. For example, the analog image signal inputted to the image decoding unit 20 can be converted into a digital signal of CCIR656 format.

The multimedia processing unit 40 temporarily stores the digital image signal from the image decoding unit 20 in the first memory 50, reads the image signal stored in the first memory 50 according to the vertical synchronous signal from the image decoding unit 20, generates the horizontal synchronous signal (H), the vertical synchronous signal (V) and the analog image chrominance signal RGB, and transmits the generated signals to the composite image signal converting unit 60 under the control of the control unit 170.

The composite image signal converting unit 60 converts the horizontal/vertical synchronous signal H/V and the analog image chrominance signal RGB from the multimedia processing unit 40 into the composite image signal CVBS3, and transmits the converted signal to the image processing unit 70.

The image processing unit 70 compensates for a magnitude and color of the composite image signal CVBS3 from the composite image signal converting unit 60, generates the image display control signal for displaying the image, and transmits the signal to the image display unit 80. The image display unit 80 displays the image according to the image display control signal from the image processing unit 70.

At the same time, the audio signal Audio1 from the TV tuner 10 is transmitted to the audio amplifying unit 110 according to the switching operation of the signal switching unit 30, amplified in the audio amplifying unit 110 at a predetermined amplification rate, transmitted to the speaker 120 and outputted from the speaker 120.

In addition, the audio signal amplified in the audio amplifying unit 110 is transmitted to the radio signal transmitting unit 130, converted into a radio frequency signal in the radio signal transmitting unit 130, and transmitted through the antenna 140. Since the audio signal is outputted in form of the radio frequency signal, the user can listen to the audio signal through the radio in a remote place.

Here, when the user selects an image capture through the remote controller or key input unit 160, the control unit 170 transmits a control signal for commanding image capturing to the multimedia processing unit 40.

The multimedia processing unit 40 captures an image signal in a time selected by the user among the image signals read from the first memory 50 in a real time in order to display the image, converts the captured image signal into a still image data, encodes the image data and stores it in the first memory 50 under the control of the control unit 170.

For example, the still image data can be encoded in a JPEG image format. For reference, the JPEG format is a loss encoding type format defined by the Joint Photographic Coding Experts Group.

According to the user's selection, the encoded image data stored in the first memory 50 can be stored in the third memory 52 which is a non-volatile memory device by the multimedia processing unit 40.

In addition, the encoded image data of the still image stored in the first memory 50 or third memory 52 according to the user's selection is decoded by the multimedia processing unit 40, converted into the horizontal/vertical synchronous signal H/V and the analog image chrominance signal RGB, transmitted to the composite image signal converting unit 90, and displayed through the image display unit 80.

Here, when the user selects a group of a plurality of still images, the still images selected by the user can be displayed one by one in a slide type for a predetermined time.

When the user selects an audio signal capture through the remote controller or key input unit 160, the control unit 170 transmits the audio signal from the TV tuner 10 to the multimedia processing unit 40, transmits a control signal to the signal switching unit 30 to transmit the audio signal from the multimedia processing unit 40 to the audio amplifying unit 110, and transmits a control signal for commanding the audio capturing to the multimedia processing unit 40.

The signal switching unit 30 transmits the audio signal from the TV tuner 10 to the multimedia processing unit 40 and the audio signal from the multimedia processing unit 40 to the audio amplifying unit 110 according to the switching operation under the control of the control unit 170.

The multimedia processing unit 40 captures the audio signal from the signal switching unit 30 for a time selected by the user, converts the captured audio signal into a digital audio data, encodes the digital audio data and stores the data in the first memory 50 under the control of the control unit 170.

For example, the digital audio data can be encoded in an MPEG-1 Audio Layer 3 (MP3) format. For reference, the MP3 format is a technical standard for encoding and transmission of audio signals defined by the Motion Pictures Expert Group.

According to the user's selection, the encoded digital audio data stored in the first memory 50 can be stored in the third memory 52 which is a non-volatile memory device by the multimedia processing unit 40.

In addition, the encoded digital audio data stored in the first memory 50 or third memory 52 according to the user's selection is decoded by the multimedia processing unit 40, transmitted to the audio amplifying unit 110 through the medium of the signal switching unit 30. Thus, the audio data can be outputted through the speaker 120 and transmitted in form of a radio frequency signal through the radio signal transmitting unit 130.

When the user sets up a reservation capture time through the remote controller or key input unit 160, the control unit 170 controls the multimedia processing unit 40 in the reservation capture time set up by the user, so that the user can capture and store the still images and audio signals in a wanted time. In the case of the image, the still images are captured in the reservation capture time set up by the user, in time units selected by the user, in a number selected by the user. In the case of the audio, the audio signals are captured in the reservation capture time set up by the user for the time selected by the user.

According to the operation command inputted by the user through the remote controller or key input unit 160, the multimedia processing unit 50 transmits the image data or audio data stored in the first memory 50 or third memory 52 to an external terminal accessing through the connection terminal 100, or receives the image data or audio data from the external terminal accessing through the connection terminal 100, and stores the data in the first memory 50 or third memory 52 under the control of the control unit 170. Here, the data communication is relayed by the external terminal communication unit 90.

The image data or audio data transmitted from the external terminal and stored in the first memory 50 or third memory 52 can be decoded by the multimedia processing unit 40 according to the user's selection, and displayed through the image display unit 80 or outputted through the speaker 120.

As described above, the image and audio are outputted according to the broadcasting signal inputted through the TV tuner 10, converted into the digital data, and stored and reproduced. However, the digital data conversion, storing and reproduction of the image and audio signal inputted through the auxiliary signal input terminal Aux are also performed in the same manner.

In this case, the image decoding unit 20 processes the composite image signal CVBS2 from the auxiliary signal input terminal Aux under the control of the control unit 170, instead of the composite image signal CVBS1 from the TV tuner 10. The signal switching unit 30 transmits the audio signal Audio2 inputted through the auxiliary signal input terminal Aux to the audio amplifying unit 110 and the multimedia processing unit 40 under the control of the control unit 170, instead of the audio signal Audio1 from the TV tuner 10.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

As discussed earlier, in accordance with the present invention, the cable/radio broadcasting signal and the auxiliary image and audio signals inputted to the television are converted into the digital image data and audio data, encoded and stored according to the user's selection. The stored digital image data and audio data are outputted in form of the analog still image and audio. Accordingly, the television can convert the displayed and outputted image and audio into the digital data, store and reproduce the digital data without requiring an additional apparatus. That is, an additional computer system and multimedia board are not necessary, so that people can store and reproduce the displayed and outputted image and audio through the television at a low cost.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A multi-function television comprising:
    a television tuner for receiving a broadcasting signal as a cable/radio signal type, tuning the received signals in a frequency band selected by the user, transmitting the tuned analog type composite image signal and an audio signal;
    an image decoding unit for separating horizontal/vertical synchronous signals and a digital image signal from the analog composite image signal from the TV tuner and converting the signals, and transmitting the signals;
    a user's interface means for receiving the operation commands from the user;
    a multimedia processing unit for digitizing a digital image signal inputted from the image decoding unit and an analog audio signal inputted from the television tuner, capturing, encoding and storing the digitized data, and decoding the encoded data, outputting the image and audio signals for reproduction;
    a memory means for storing digital image and audio data, an internal function command code for encoding/decoding the image and audio data and temporary data for the processing of image and audio data;
    an image display means for receiving the image signal outputted from the multimedia media processing unit and displaying the image;
    an audio output means for receiving the audio signal outputted from the television tuner and outputting the audio; and
    a control unit for controlling the television tuner, the image decoding unit, the multimedia processing unit, the image displaying means and the audio output means according to the operation command inputted from the user's interface means.

2. The multi-function television according to claim 1, wherein the multi-function television further comprises:
    an auxiliary signal input terminal for receiving image and audio signals outputted from another image and audio devices besides a broadcasting signal; and
    a signal switching unit for selectively switching an audio signal inputted through the auxiliary signal input terminal and an audio signal inputted from the television tuner and transmitting the selected signal to the multimedia processing unit and the audio output means according to the control of the control unit.

3. The multi-function television according to claim 1, wherein the multi-function television further comprises:
    a connection terminal connected to an external terminal; and
    an external terminal communication unit for relaying the image and audio data between the external terminal accessing through the medium of the connection terminal and the multimedia processing unit through a local area communication protocol.

4. The multi-function television according to claim 3, wherein the external terminal communication unit relays data by a universal serial bus (USB) communication protocol.

5. The multi-function television according to claim 1, wherein the image display means comprises a composite image signal converting unit for converting the analog horizontal/vertical synchronous signal and an image chrominance signal from the multimedia processing unit into the composite image signal and transmitting the composite image signal,
    an image processing unit for outputting an image display control signal in order to display the image by the composite image signal outputted from the composite image signal converting unit; and
    an image displaying unit for displaying the image by the image display control signal outputted from the image processing unit.

6. The multi-function television according to claim 1, wherein the audio output means comprises an audio amplifying unit for amplifying an audio signal;
    a speaker for converting the audio signal from the audio amplifying unit into an audible audio signal, and outputting the audible audio signal; and
    a headphone output terminal for outputting the audio signal amplified by the audio amplifying unit.

7. The multi-function television according to claim 6, wherein the audio output means further comprises a radio signal transmitting unit for converting the audio signal from the audio amplifying unit into a radio frequency signal, and an antenna for transmitting the converted signal.

8. The multi-function television according to claim 1, wherein the control unit performs a control operation for controlling the multimedia processing unit in the reservation time set up by the user in order to capture and store the still images in a wanted time.

9. The multi-function television according to claim 1, wherein the control unit performs a control operation for controlling the multimedia processing unit in the reservation time set up by the user in order to capture and store the audio signals in a wanted time.

10. The multi-function television according to claim 8, wherein the control unit performs a control operation for controlling the multimedia processing unit in the reservation time set up by the user in order to capture and store the audio signals in a wanted time.

* * * * *